(12) United States Patent
Hearnden

(10) Patent No.: US 6,768,991 B2
(45) Date of Patent: Jul. 27, 2004

(54) SEARCHING FOR SEQUENCES OF CHARACTER DATA

(75) Inventor: Stephen Owen Hearnden, Great Holm (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 425 days.

(21) Appl. No.: 09/854,456

(22) Filed: May 15, 2001

(65) Prior Publication Data

US 2002/0188926 A1 Dec. 12, 2002

(51) Int. Cl.[7] .............................................. G06F 17/30
(52) U.S. Cl. ................................ 707/5; 707/4; 707/6
(58) Field of Search ........................................ 707/1–7

(56) References Cited

U.S. PATENT DOCUMENTS

| | | | | |
|---|---|---|---|---|
| 5,226,148 A | * | 7/1993 | Littlewood .................... | 714/50 |
| 5,418,951 A | * | 5/1995 | Damashek ..................... | 707/5 |
| 5,640,551 A | * | 6/1997 | Chu et al. ...................... | 707/5 |
| 5,708,804 A | * | 1/1998 | Goodwin et al. .............. | 707/3 |
| 5,737,732 A | * | 4/1998 | Gibson et al. ................. | 707/2 |
| 6,012,057 A | * | 1/2000 | Mayer et al. .................. | 707/6 |
| 6,041,323 A | * | 3/2000 | Kubota .......................... | 707/5 |
| 2003/0009447 A1 | * | 1/2003 | Maurray et al. | |

OTHER PUBLICATIONS

Boyer et. al., A Fast String Searching Algorithm, Communication of the ACM, Oct. 1997, vol. 20, pp. 762–772.*

* cited by examiner

*Primary Examiner*—Greta Robinson
*Assistant Examiner*—Debbie M. Le
(74) *Attorney, Agent, or Firm*—Nixon & Vanderhye P.C.; Christopher J. Hamaty

(57) ABSTRACT

A modified Boyer-Moore searching algorithm used within an E-mail filtering system for detecting the presence of a plurality of target band strings during a single traversal of the character data to be searched. A single jump table for the combined set of strings for which a search is being made is used. A hierarchical match table starting with the possible terminating letters of strings for which a search is being made is traversed to identify any strings as they are encountered.

24 Claims, 6 Drawing Sheets

Match Table

Jump Table

| Last Char | Jump |
|---|---|
| a | 3 |
| b | 3 |
| e | 2 |
| g | 4 |
| h | 1 |
| l | 3 |
| m | 1 |
| t | 1 |
| (others) | 4 | alpha, beta, gamma

SEARCHING FOR SEQUENCES OF CHARACTER DATA

BACKGROUND OF THE INVENTION

1. Field of the Invention

This invention relates to the field of data processing systems. More particularly, this invention relates to searching within a sequence of character data for occurrence of one or more words each formed of a predetermined sequence of characters.

2. Description of the Prior Art

It is known to provide content scanning systems that search within files of character data to identify predetermined strings. A typical such system would be an E-mail filtering system in which the strings being search for were members of a predefined collection of banned words, such as swear words.

A problem with such systems is that the volumes of data needing to be checked, such as the volume of E-mail traffic, is tending to increase at the same time as the number of strings that need to be checked for is also increasing. These factors combine to disadvantageously increase the processing load associated with content scanning of this type. Measures that can address this problem are strongly advantageous.

SUMMARY OF THE INVENTION

Viewed from one aspect the present invention provides a computer program product comprising a computer program operable to control a computer to search within a sequence of character data for occurrence of any of a plurality strings each formed of a predetermined sequence of characters, said computer program comprising:

(i) character identifying logic operable to identify a target character at a target search position within said sequence of character data;

(ii) string identifying logic operable to compare character data preceding said target character with data indicative of any of said plurality of strings that terminate with said target character to identify an occurrence of any of said plurality of strings that terminate with said target character; and (iii) target search position advancing logic operable to advance said target search position within said sequence of character data by a predetermined number of character positions equal to a smallest number of character positions separating said target character from a last character within any of said plurality of strings.

The invention provides a modified form of the Boyer-Moore Fast String Searching Algorithm as is described in the publication "A Fast String Searching Algorithm", R. S. Boyer with J. S. Moore, Communications of the Association for Computing Machinery, Volume 20, No. 10, page 762–772, 1977. In particular, the invention recognises that this approach may be adapted to search for a plurality of strings each formed of a predetermined sequence of characters in a single pass through the document in a manner that increases the overall efficiency of the search and allows it to cope with increasing data volumes and increasing numbers of strings for which a search is to be made.

The advancing of the search position is preferably controlled by a single jump table established for all of the plurality of strings for which a search is being made. The jump table holds for each character the closest proximity of that character to the end of any of the plurality of strings for which a search is being made. If a character does not appear in any of the strings for which a search is being made, then a jump equal to the shortest of the strings for which a search is being made.

A tree of search portions is kept. There are two distinct portion types in the structure.

An implementor may wish to describe explicitly within the portion its type.

1. A leaf portion. This is represented by:

The maximum length of all strings it contains.

The Depth of this portion in the tree.

A table of the strings matched by this portion.

(The type of the portion).

2. A Branch portion. This is represented by:

The depth of this portion.

The strings which are impicitly matched by this portion.

A table indexed by character describing which portion continues the search.

The portion it describes could be a leaf or branch portion.

(The type of the portion).

The preferred implementation has a different structure for the first portion in the tree. This is because it has no implicit matches (0 length strings) and an opportunity to optimize the first character→portion lookup.

Other aspects of the invention also provide a method for searching within a sequence of character data for predetermined strings and an apparatus for searching within a sequence of character data for predetermined strings.

The above, and other objects, features and advantages of this invention will be apparent from the following detailed description of illustrative embodiments which is to be read in connection with the accompanying drawings.

DESCRIPTION OF THE PREFERRED EMBODIMENTS

Figures 1, 2:
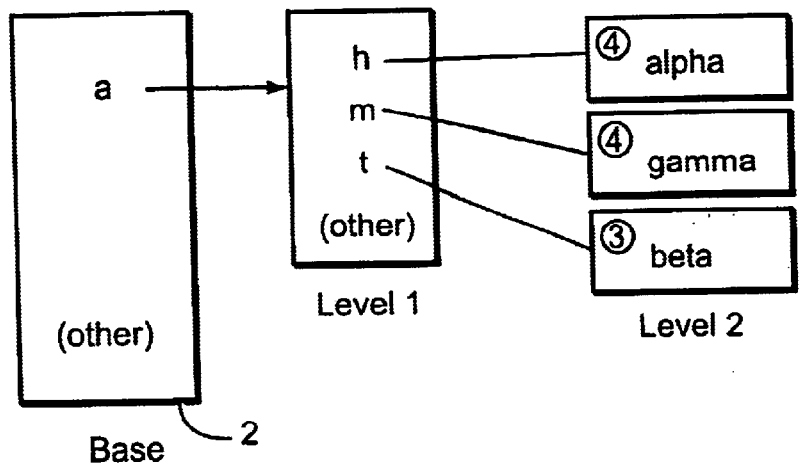
FIG. 1 schematically illustrates a simple example of a search technique being applied to a plurality of strings simultaneously.
FIG. 2 schematically illustrates a jump table for use in accordance with the present technique.

FIGS. 1 and 2 schematically illustrate a search that identifies the presence of any of the words "alpha", "beta" and "gamma" within a file of character data. Each of these words ends in the letter "a". The search within the sequence of character data starts at a target position advanced within the sequence of character data by the length of the shortest string for which a search is being made. In this case, the shortest string is "beta" and accordingly the search starts at the fourth character. This fourth character is read and identified. The identified character is then used to look up in the base level 2 of the match table to see if there are any strings being searched for that end with that letter. As indicated for this simple example, if the character identified is anything other than an "a", then there are no strings being searched for that terminate in the identified letter and accordingly the target character being examined cannot be the last letter of one of the words for which a search is being made and it is safe to make a jump to the next position within the sequence of character data being searched.

FIG. 2 illustrates the jump table in which the character identified at the target position is used to determine what is a safe jump to apply to the target search position to advance that target search position within the sequence of character data being searched. For all of the possible characters, the jump table holds the shortest distance that character appears from the end of a string for which a search is being made. For characters not appearing in any of the strings for which a search is being made, the length of the shortest strings for which a search is being made is used as a default.

Thus, if the character at the target search position was identified as an "e", then the match table of FIG. 1 would indicate that the target position was not the final character in any of the strings for which a search is being made. Reference to the jump table would then indicate that an advance of two character positions within the sequence of character data being searched was safe to apply since if the "e" identified was in fact the "e" within the string "beta", then the jump of two would result in the new target search position being the "a" at the end of the string "beta" and accordingly the string "beta" would be identified by the match table. In most cases, the "e" identified will not in fact be within a string for which a search is being made, but nevertheless the jump applied will be safe to ensure that no strings for which a search is being made are missed by being stepped over.

It will be appreciated that the application of the jump table derived for all of a plurality of strings for which a search is being made will generally produce relatively small jumps, but this will nevertheless still preserve the advantage of the sequence of character data being searched only have to be traversed once in order to detect any of the strings for which a search is being made.

Considering the match table of FIG. 1 in more detail, when the character at the target position is identified within the base level portion 2 as being one that terminates one of the strings for which a search is being made, then the entry for that character points to a portion of the table at a lower level that includes data specifying all the letters that may precede the letter identified within any of the strings for which a search is being made. In the example illustrated, the three possibilities for letters preceding an identified letter "a", at the target search position that would be consistent with that "a" being the last letter within one of the strings for which a search is being made are the letters "h", "m" and "t". If any other letter is found preceding the "a", then this indicates that the "a" is not terminating one of the strings for which a search is being made.

The match table has a hierarchical arrangement whereby a tree-like relationship is established between nodes with each node being connected to at least one other node that is either a node higher in the hierarchy corresponding to a character succeeding the character that is among those specified in that node within any of the strings for which a search is being made or a node lower in the hierarchy corresponding to a character preceding the one or more characters associated with that node in one or more of the strings for which a search is being made. The hierarchy continues to break down the possibilities for the matches that are being identified until at the lowest level, in this particular preferred embodiment, two or one possible string matches are specified. By the time the hierarchy has been traversed to narrow down the possibilities to at most two strings, then the processing required to read the character data encompassing those two possibilities from within the sequence of character data being searched and actively compare it to the two possible strings is comparatively low. At the lowest level, each node includes an indication of the maximum string length specified by a potential matching string at that node in order that the system can determine how many characters to read from the sequence of character data being searched for comparison with the candidate strings specified by that node. In the example illustrated in FIG. 1, each of the searches terminates at a node containing only a single possible candidate string for which a search is being made. This is at Level 2 within the hierarchy. At the preceding level, Level 1, the three possibilities for letters that may precede a final "a" are specified and include pointers to their respective lower level nodes where the identification of the possible strings still remaining as candidates is further refined. If at any level the next character examined precludes a match to any of the strings for which a search is being made, then the matching process can terminate and the jump specified by the jump table of FIG. 2 can be applied.

Figure 3:
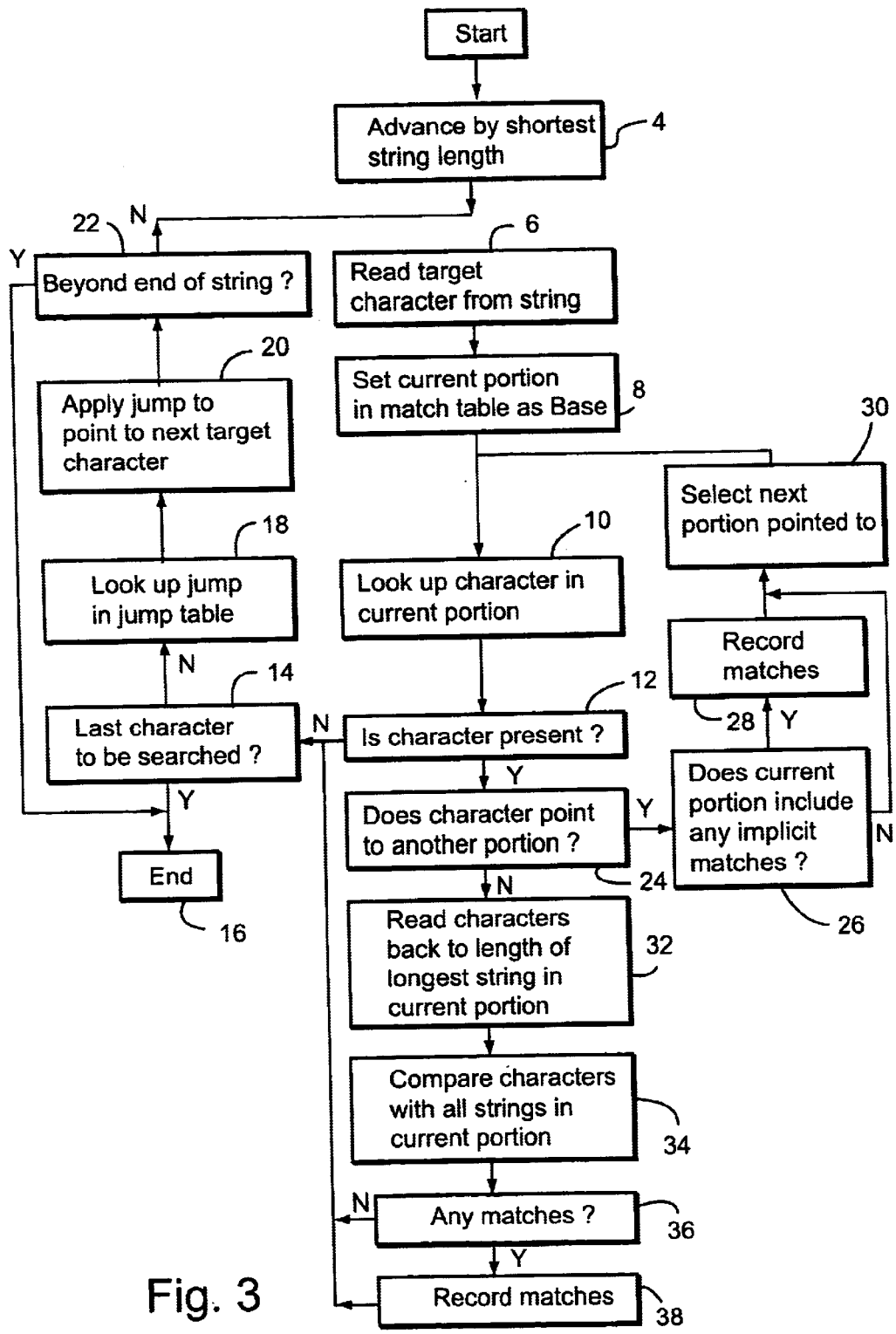
FIG. 3 is a flow diagram illustrating the searching algorithm.

FIG. 3 is a flow diagram illustrating the searching technique described above. At step 4 the sequence of character data being searched is advanced through by the length of the shortest string for which a search is being made to find the initial target character. At step 6 this target character is read and identified. At step 8 the use of the match table of FIG. 1 is initialised by setting the current portion of the table being searched through as the base portion 2. At step 10 the character identified at step 6 is looked up within the current portion. Step 12 determines whether or not the character looked up is present within the current portion. If the character is not present, then processing proceeds to step 14 where a determination is made as to whether the character being searched is the last within the sequence of character data being searched. If this is the case, then processing terminates at step 16. If the character being searched is not the last within the sequence of character data, then step 18 looks up the appropriate jump to be applied and step 20 then uses that jump to point to the next target character. Step 22 makes a check as to whether or not the jump has taken the target position beyond the end of the sequence of character data being searched and if so terminates processing at step 16, otherwise processing returns to step 6.

If the test at step 12 indicated that the character identified at step 6 is present within the current portion, then step 24 determines whether or not the data corresponding to the identified letter points to another portion lower in the hierarchy of the match table or whether the lowest point has been reached within the match table. If the entry within the current portion does point to another portion, then processing proceeds to step 26. It may be that certain words being searched for appear as suffixes within longer strings for which a search is also being made. In order to deal with this possibility, such suffix-type strings are indicated within portions of the hierarchy higher than the lowest level and recorded as "implicit" matches whilst the hierarchy is being traversed even though the lowest level within the hierarchy has not yet been reached. Such suffix-type matches are recorded at step 28 if they are present. Step 30 then proceeds to select the next portion as pointed to by the current portion and processing is returned to step 10.

If the determination at step 24 was that the current portion does not point to any other portions, then processing proceeds to step 32 at which those characters within the sequence of characters being searched up to a length specified within the current portion are read. The number of characters specified corresponds to the longest length of a string that is still a candidate and is being checked for by the current portion at its lowest level position within the hierarchy. Step 34 carries out a character comparison between the characters read from the sequence of characters at step 34 with the strings specified within that current portion. If no matches are found as tested at step 36, then processing proceeds to step 14. If matches are found, then these are recorded at step 38 before processing again proceeds to step 14.

Figure 4:
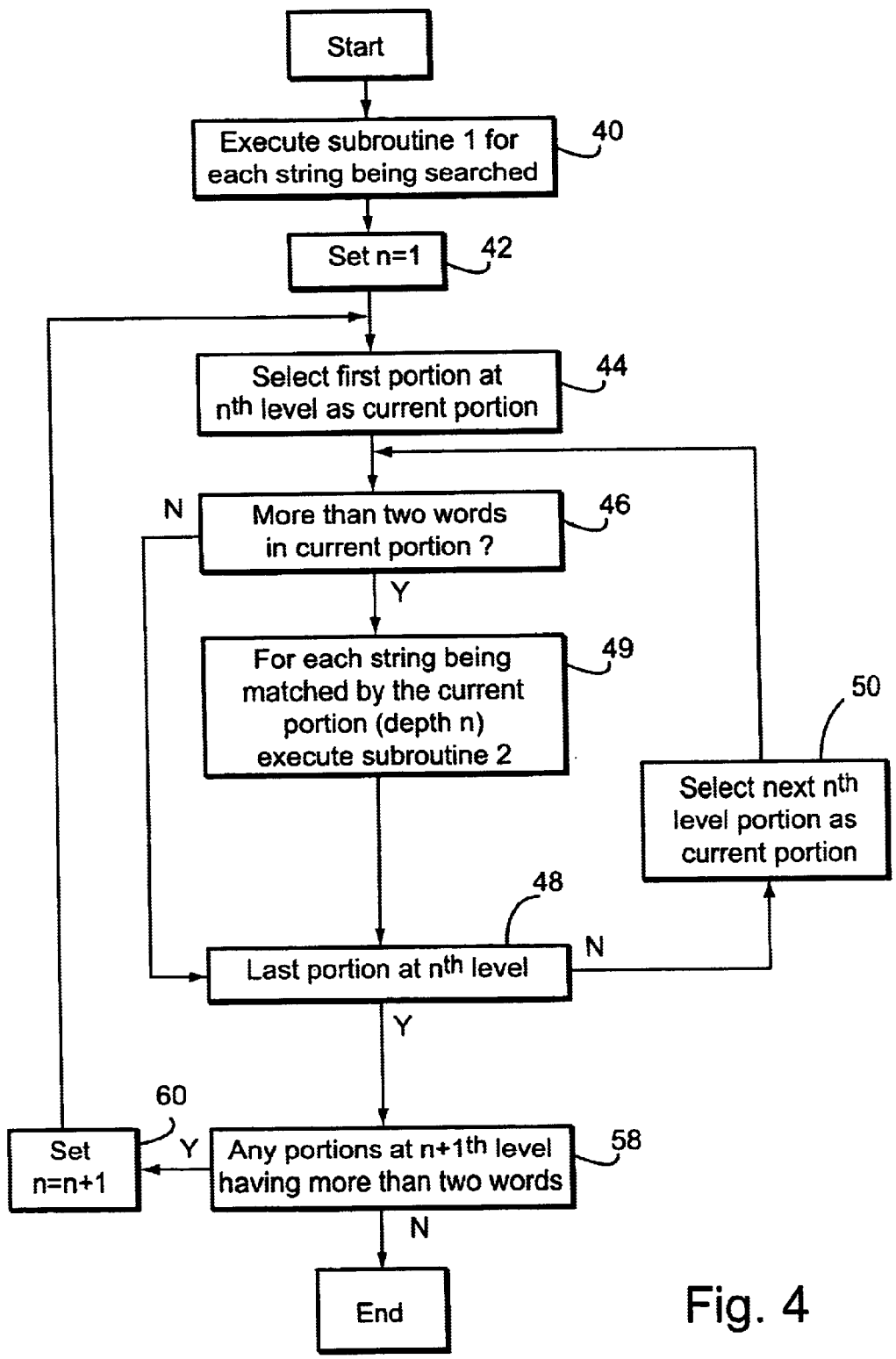
FIG. 4 is a flow diagram illustrating the generation of the match table.

FIG. 4 is a flow diagram illustrating how the match table of FIG. 1 may be initialised in the first instance. At step 40, the following subroutine (subroutine 1) is performed for each string being searched:

```
1  Set Char = Last character in string.
2  Is there a portion for Char already?
3  No: Create a new portion of depth 1.
4  goto 6
5  Yes: goto 6
6  Add String to portion.
7  Adjust the portion (either newly created or pre-existing) max length
   to take account of this string's length.
```

At step 42, a variable "n" is set to 1 to indicate the starting level to be processed during this initialisation that follows. As "n" advances, this progressively indicates that the second, third and so forth levels are being processed during the initialisation.

At step 44, the first $n^{th}$ level portion is selected as the current portion. Step 46 identifies whether that currently selected portion contains two or more candidate strings for which a search is to be made. If the current portion does not contain two or more strings, then processing proceeds to step 48 to test whether that is the last portion at the $n^{th}$ level. If the current portion is not the last portion at the $n^{th}$ level, then step 50 selects the next $n^{th}$ level portion as the current portion and processing returns to step 46.

If the test at step 46 indicated that more than two strings were specified in the current portion, then step 49 serves to execute the following subroutine (subroutine 2) for each string being matched by the current portion:

```
1  Set Char = Nth character from Last in string. (The N th character
   counting from right to left in the string)
2  Is there a portion for Char already?
3  No: Create a new portion of depth N + 1.
4  goto 6
5  Yes: goto 6
6  Is the string longer than N
7  Yes: Add String to portion.
8  No: Add String to this portions implicit.
9  Adjust the portion (either newly created or pre-existing) max length
   to take account of this string's length.
```

Processing then proceeds to step 48.

If the test at step 48 indicated that the last portion at the $n^{th}$ level has been reached, then processing proceeds to step 58 where a test is made as to whether or not any of the $n+1^{th}$ level portions have more than two strings and so require further splitting. If further splitting is required, then the variable "n" is incremented at step 60 and processing is returned to step 44. If no candidates for further splitting are identified at step 58, then the hierarchy has been fully formed and the processing terminates.

Figure 5:
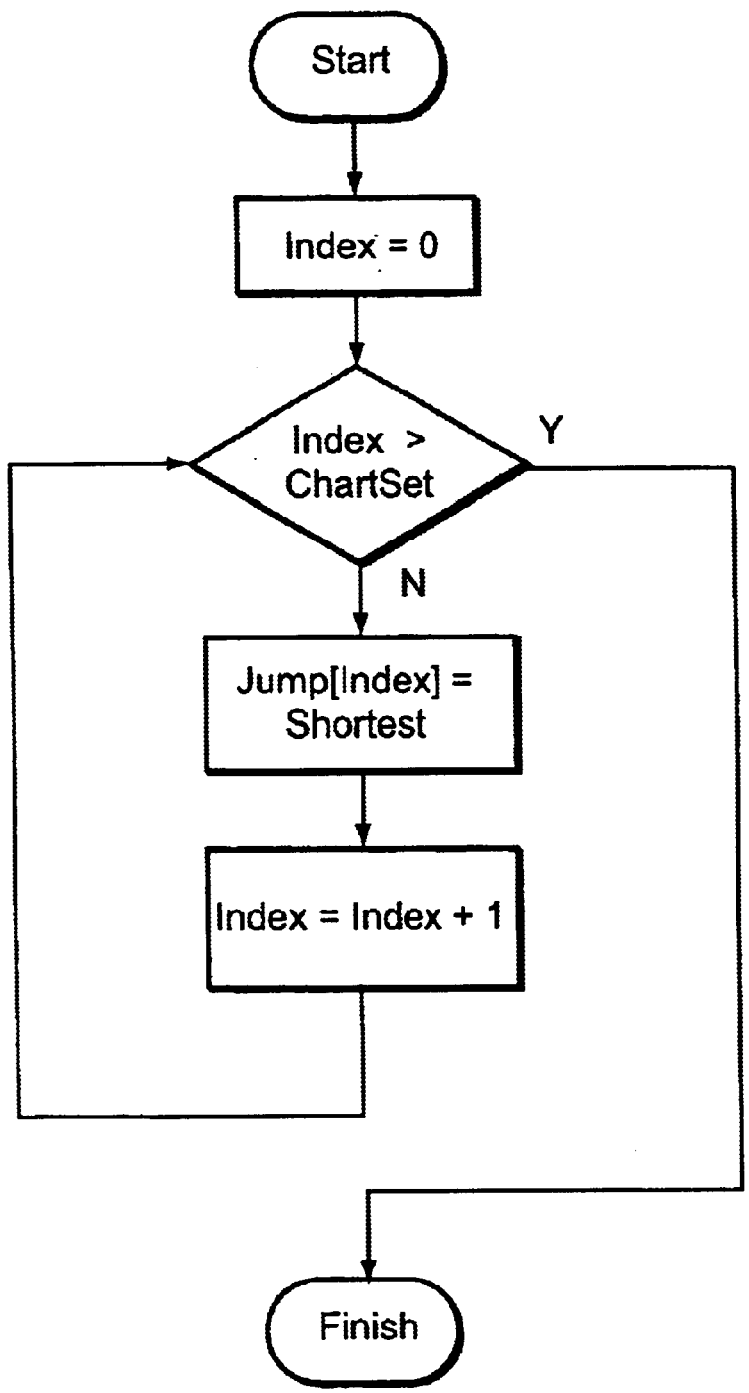
FIGS. 5 and 6 illustrate the initialisation and population of the jump table.
Figure 6:
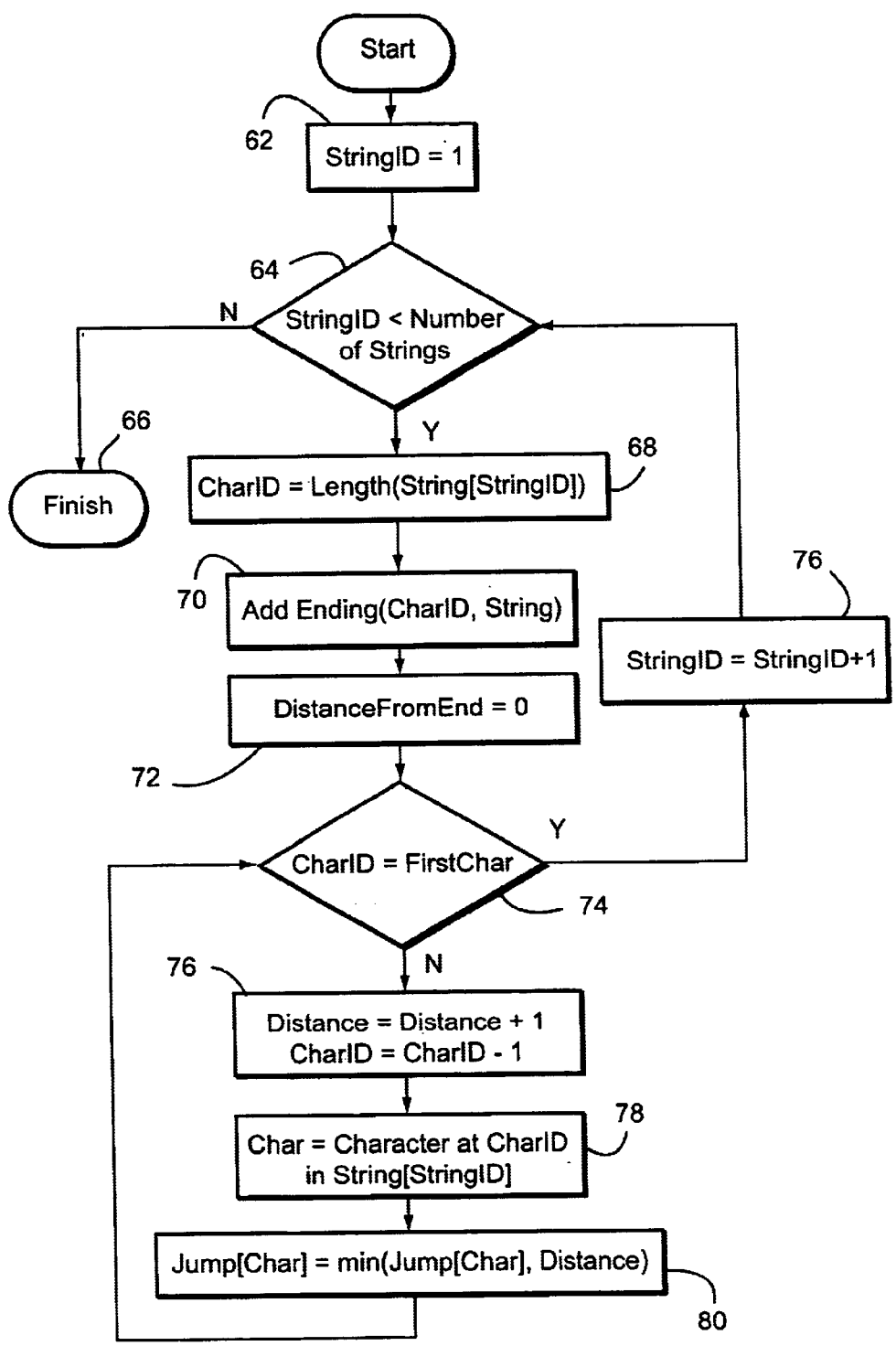

FIGS. 5 and 6 illustrate the initialisation of the jump table of FIG. 2. For each possible character within the sequence of character data FIG. 5 serves to set the initial jump value for the characters to be the length of the shortest string for which a search is being made. This establishes the default value of the jump to be applied before processing proceeds to the algorithm illustrated in FIG. 6 where the actual string for which a search is being made are considered.

At step 62 the first string within the collection of strings for which a search is being made is selected. Step 64 tests whether or not the last string within the collection of strings being searched has yet been reached. If the last string has been reached, then processing terminates at step 66.

If the last string has not yet been reached, then step 68 sets the character identifying pointer to a value equal to the length of the currently selected word (string). Step 70 identifies the last character of the currently selected string and this may then be added to the base level portion 2 of the match table of FIG. 1 as a possible terminating character for a word string with the string in question then being allocated to a linked Level 1 portion for that terminating character. At step 72, the distance from end variable is initialised at a value of 0. At step 74, a test is made as to whether or not the comparison being subsequently performed has yet reached the first character in the current word. If the first character is reached, then the next word is selected at step 66 and processing is returned to step 64.

If the first character has not yet been reached, then step 76 serves to increase the distance from the end by 1 and decrease the character identifier by one. Step 78 then reads the character within the string indicated by the current character indicator that has just been decremented at step 76. Step 80 then sets the jump value for the identified character from step 78 to be the lesser of either the current jump value for that character or the current distance value as incremented at step 76. Thus, whilst the jump value for all the characters may be initialised to be the shortest string length by the operation of the algorithm of FIG. 5, step 80 serves to reduce these values further when the character in question is identified within one of the strings for which a search is being made at a position somewhere within one of those string at less than the default value from the end of that word.

After step 80, processing returns to step 74 and terminates when the beginning of the current word has been reached as previously explained.

Figure 7:
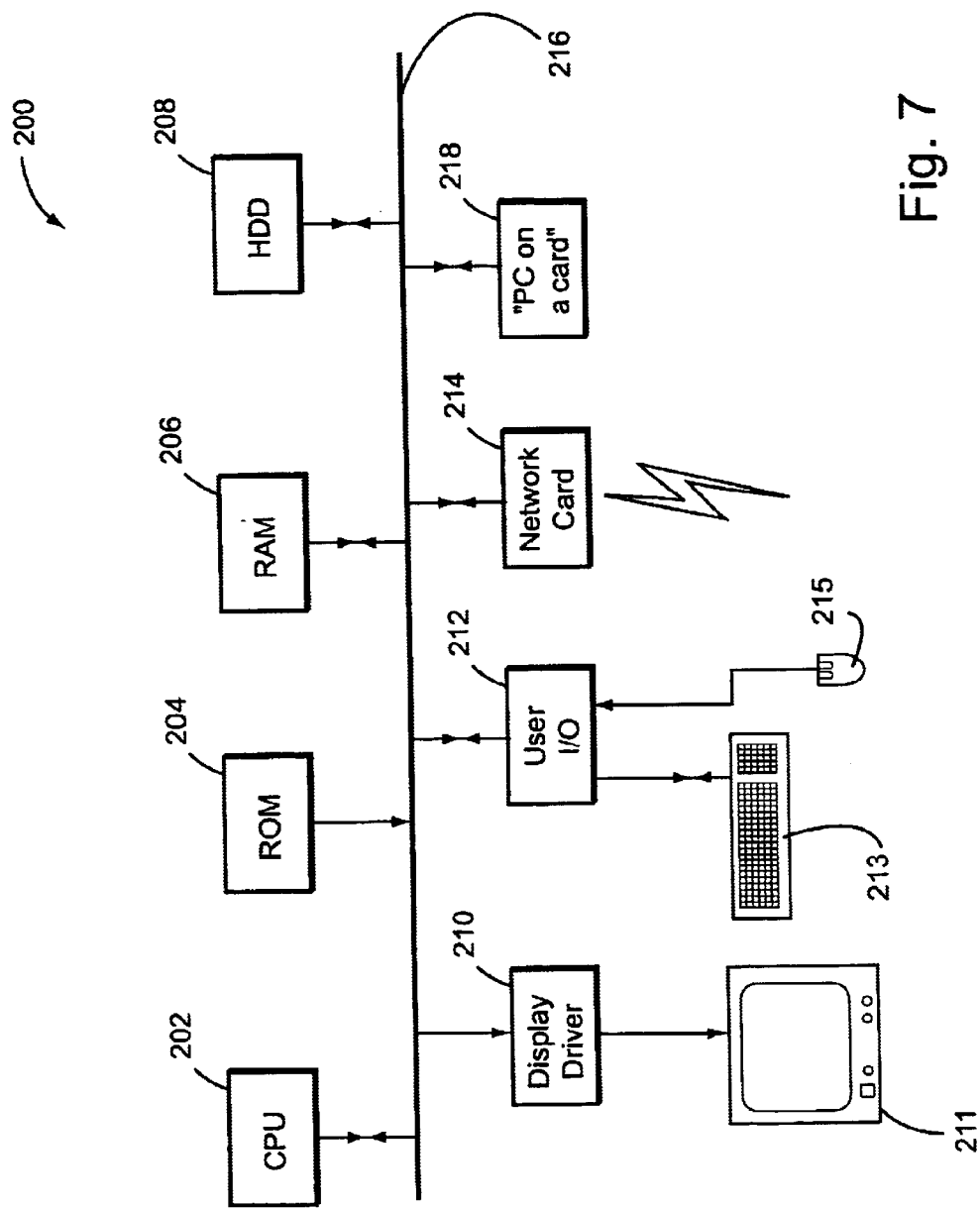
FIG. 7 illustrates a general purpose computer of a type that may be used to implement the above described techniques.

FIG. 7 illustrates a general purpose computer 200 of the type that may be used to perform the above described techniques. The general purpose computer 200 includes a central processing unit 202, a read only memory 204, a random access memory 206, a hard disk drive 208, a display driver 210 with attached display 211, a user input/output circuit 212 with attached keyboard 213 and mouse 215, a network card 214 connected to a network connection and a PC computer on a card 218 all connected to a common system bus 216. In operation, the central processing unit 202 executes a computer program that may be stored within the read only memory 204, the random access memory 206, the hard disk drive 208 or downloaded over the network card 214. Results of this processing may be displayed on the display 211 via the display driver 210. User inputs for triggering and controlling the processing are received via the user input/output circuit 212 from the keyboard 213 and mouse 215. The central processing unit 202 may use the random access 206 as its working memory. A computer program may be loaded into the computer 200 via a recording medium such as a floppy disk drive or compact disk. Alternatively, the computer program may be loaded in via the network card 214 from a remote storage drive. The PC on a card 218 may comprise its own essentially independent computer with its own working memory, CPU and other control circuitry that can co-operate with the other elements in FIG. 4 via the system bus 216. The system bus 216 is a comparatively high bandwidth connection allowing rapid and efficient communication.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A computer program product comprising a computer program operable to control a computer to search within a sequence of character data for occurrence of any of a plurality strings each formed of a predetermined sequence of characters, said computer program comprising:

character identifying logic operable to identify a target character at a target search position within said sequence of character data;

string identifying logic operable to compare character data preceding said target character with data indicative of any of said plurality of strings that terminate with said target character to identify an occurrence of any of said plurality of strings that terminate with said target character; and target search position advancing logic operable to advance said target search position within said sequence of character data by a predetermined number of character positions equal to a smallest number of character positions separating said target character from a last character within any of said plurality of strings.

2. A computer program product as claimed in claim 1, wherein said character identifying logic, said string identifying logic and said target search position advancing logic operate in a repeating sequence until said target search position reaches an end of said sequence of character data.

3. A computer program product as claimed in claim 1, wherein said plurality of strings comprise a collection of problem words for which a search is made through said sequence of character data.

4. A computer program product as claimed in claim 3, wherein said sequence of character data comprises e-mail message data and said search for problem words is part of an e-mail filtering operation.

5. A computer program as claimed in claim 1, wherein said target search position advancing logic is responsive to a predetermined table of jump data specifying said predetermined number of character position for each target character.

6. A computer program product as claimed in claim 1, wherein said string identifying logic uses a hierarchical data structure to identify said plurality of strings, nodes within said hierarchy corresponding to a match character preceding said target character by a predetermined number of character positions and being connecting to at least one of:

(i) a node higher in said hierarchy corresponding to a character succeeding said match character in one or more of said plurality of strings; and (ii) a node lower in said hierarchy corresponding to a character preceding said match character in one or more of said plurality of strings.

7. A computer program product as claimed in claim 6, wherein at a lowest level in said hierarchy traced along a path through said hierarchy a lowest node specifies at least one of said plurality of strings.

8. A computer program product as claimed in claim 7, wherein said lowest node specifies a longest character length of any string specified by said lowest node such that said string identifying logic can read a number of characters corresponding to said longest character length from said sequence of character data to be compared with any string specified by said lowest node.

9. A method of searching within a sequence of character data for occurrence of any of a plurality strings each formed of a predetermined sequence of characters, said method comprising the steps of:

identifying a target character at a target search position within said sequence of character data;

comparing character data preceding said target character with data indicative of any of said plurality of strings that terminate with said target character to identify an occurrence of any of said plurality of strings that terminate with said target character; and advancing said target search position within said sequence of character data by a predetermined number of character positions equal to a smallest number of character positions separating said target character from a last character within any of said plurality of strings.

10. A method as claimed in claim 1, wherein said steps of identifying, comparing and advancing operate in a repeating sequence until said target search position reaches an end of said sequence of character data.

11. A method as claimed in claim 9, wherein said plurality of strings comprise a collection of problem words for which a search is made through said sequence of character data.

12. A method as claimed in claim 11, wherein said sequence of character data comprises e-mail message data and said search for problem words is part of an e-mail filtering operation.

13. A computer program as claimed in claim 9, wherein said step of advancing is responsive to a predetermined table of jump data specifying said predetermined number of character position for each target character.

14. A method as claimed in claim 9, wherein said steps of comparing uses a hierarchical data structure to identify said plurality of strings, nodes within said hierarchy corresponding to a match character preceding said target character by a predetermined number of character positions and being connecting to at least one of:

(i) a node higher in said hierarchy corresponding to a character succeeding said match character in one or more of said plurality of strings; and (ii) a node lower in said hierarchy corresponding to a character preceding said match character in one or more of said plurality of strings.

15. A method as claimed in claim 14, wherein at a lowest level in said hierarchy traced along a path through said hierarchy a lowest node specifies at least one of said plurality of strings.

16. A method as claimed in claim 15, wherein said lowest node specifies a longest character length of any string specified by said lowest node such that said string identifying logic can read a number of characters corresponding to said longest character length from said sequence of character data to be compared with any string specified by said lowest node.

17. Apparatus for processing data operable to search within a sequence of character data for occurrence of any of a plurality strings each formed of a predetermined sequence of characters, said apparatus comprising:

a character identifier operable to identify a target character at a target search position within said sequence of character data;

a string identifier operable to compare character data preceding said target character with data indicative of any of said plurality of strings that terminate with said target character to identify an occurrence of any of said plurality of strings that terminate with said target character; and a target search position advancer operable to advance said target search position within said sequence of character data by a predetermined number of character positions equal to a smallest number of character positions separating said target character from a last character within any of said plurality of strings.

18. Apparatus as claimed in claim 17, wherein said character identifier, said strings identifier and said target search position advancer operate in a repeating sequence until said target search position reaches an end of said sequence of character data.

19. Apparatus as claimed in claim 17, wherein said plurality of strings comprise a collection of problem words for which a search is made through said sequence of character data.

20. Apparatus as claimed in claim 19, wherein said sequence of character data comprises e-mail message data and said search for problem words is part of an e-mail filtering operation.

21. A computer program as claimed in claim 17, wherein said target search position advancer is responsive to a predetermined table of jump data specifying said predetermined number of character position for each target character.

22. Apparatus as claimed in claim 17, wherein said string identifier uses a hierarchical data structure to identify said plurality of strings, nodes within said hierarchy corresponding to a match character preceding said target character by a predetermined number of character positions and being connecting to at least one of:

(i) a node higher in said hierarchy corresponding to a character succeeding said match character in one or more of said plurality of strings; and (ii) a node lower in said hierarchy corresponding to a character preceding said match character in one or more of said plurality of strings.

23. Apparatus as claimed in claim 22, wherein at a lowest level in said hierarchy traced along a path through said hierarchy a lowest node specifies at least one of said plurality of strings.

24. Apparatus as claimed in claim 23, wherein said lowest node specifies a longest character length of any word specified by said lowest node such that said string identifying logic can read a number of characters corresponding to said longest character length from said sequence of character data to be compared with any string specified by said lowest node.

* * * * *